United States Patent [19]

Asai

[11] Patent Number: 5,593,710
[45] Date of Patent: Jan. 14, 1997

[54] MOLD CAPABLE OF CHANGING A SET POSITION OF A STAMPER PLATE

[75] Inventor: Ikuo Asai, Nagoya, Japan

[73] Assignee: Meiki Co., Ltd., Ohbu, Japan

[21] Appl. No.: 504,365

[22] Filed: Jul. 19, 1995

[30] Foreign Application Priority Data

Sep. 26, 1994 [JP] Japan .................................. 6-257409

[51] Int. Cl.[6] .................................................. B29C 45/40
[52] U.S. Cl. ........................ 425/552; 264/107; 264/334; 425/556; 425/810
[58] Field of Search ..................... 425/810, 556, 425/552, 547; 264/106, 107, 334

[56] References Cited

U.S. PATENT DOCUMENTS 4,085,178  4/1978  McNeely et al. ...................... 425/810
4,971,548  3/1994  Asai ........................................ 425/810
5,297,951  3/1994  Asai ........................................ 425/810
5,316,466  5/1994  Tanaka et al. ......................... 425/810

*Primary Examiner*—Tim Heitbrink
*Attorney, Agent, or Firm*—Browdy and Neimark

[57] ABSTRACT

A mold for molding disk substrata is capable of changing a set position of a stamper plate on a mold cavity. A pair of mirror plates are respectively for forming the surface of a disc cavity or for back stay of stamper plate. The set position of mounting the stamper plate is capable of being performed due to changing selectively the set position of the mirror plate. An inner stamper holder and stamper plate are held on the mirror plate by vacuum force to admit setting operations to ease.

2 Claims, 7 Drawing Sheets

MOLD CAPABLE OF CHANGING A SET POSITION OF A STAMPER PLATE

BACKGROUND OF THE INVENTION

1. Field of the Invention

The present invention relates generally to a mold for molding disc substrata used for video discs, compact discs, or memory discs for digital data (all hereinafter described as discs) and particularly concerns a novel mold in which a stamper plate is capable of being set selectively on either a stationary half-mold side or a movable half-mold side.

2. Description of the Related Art

Generally, a mold for molding discs substrata provides a stationary half-mold including a stationary mirror plate and a movable half-mold including a movable mirror plate.

The stationary half-mold is fixed to a stationary platen of an injection molding machine, wherein a nozzle is capable of touching a sprue bushing inserted into a central portion of the stationary mirror plate so as to inject melted resin into a cavity. The movable half-mold is fixed to a movable platen, wherein a punch for forming a central hole of the disc, an ejector sleeve for ejecting a solidified disc, and an ejector pin for ejecting a solidified sprue are conjointly provided as an assembly in the central portion of the movable half-mold, and a stamper plate in which information digital data are engraved is retained on the movable mirror plate by an inner peripheral stamper holder and an outer peripheral stamper holder.

Generally the stamper plate has been fixedly set on either side, the stationary or the movable half-mold, in accordance with an original design of the mold.

In injection molding of the discs, the flow behavior of melted resin has an important effect on molded discs. Therefore it is significant to change the flow behavior of melted resin in a mold cavity of the discs.

A following method is given as a concrete example.

In a mold for molding discs, it is suggested that a stamper plate is mounted not only on a movable plate but on a stationary plate. Generally the stamper plate is mounted on a cavity surface of the movable plate side which faces a cavity of the stationary plate side having a sprue bushing for injecting of melted resin. It is a new method for changing the flow of melted resin that the stamper plate is mounted on the cavity surface of the stationary plate side which the sprue bushing is positioned.

However, if changing the set position of the stamper plate is required, many parts of the mold must be modified after dismounting of the mold from the injection molding machine.

Such modification increases molding cost in respect to the additional design and manufacturing of the mold parts.

SUMMARY OF THE INVENTION

In light of the above mentioned problems, it is an object of the present invention to provide a novel mold for molding of discs in which the flow behavior of melted resin in the mold cavity is capable of being changed so as to match various requirements according to resin flow studies.

Another object of the present invention is to provide a novel mold in which the stamper plate can be mounted on either side, the movable plate or the stationary plate, making the mirror plate also capable of mounting either on the stationary plate or the movable plate, without changing the overall mold.

A further object of the invention is to provide a novel mold in which the stamper is capable of being exchanged while holding the outer stamper holder by vacuum force on the contrary side of the plate on which the stamper is to be set in order to have an operation of exchanging the stamper be easy.

BRIEF DESCRIPTION OF THE DRAWING

The above and other objects and the nature and advantages of the present invention will become more apparent from the following detailed description of embodiments taken in conjunction with drawings, wherein.

DETAILED DESCRIPTION OF THE PREFERRED EMBODIMENT

This invention will be described in further detail by way of an example with reference to the accompanying drawings.

Figure 1:
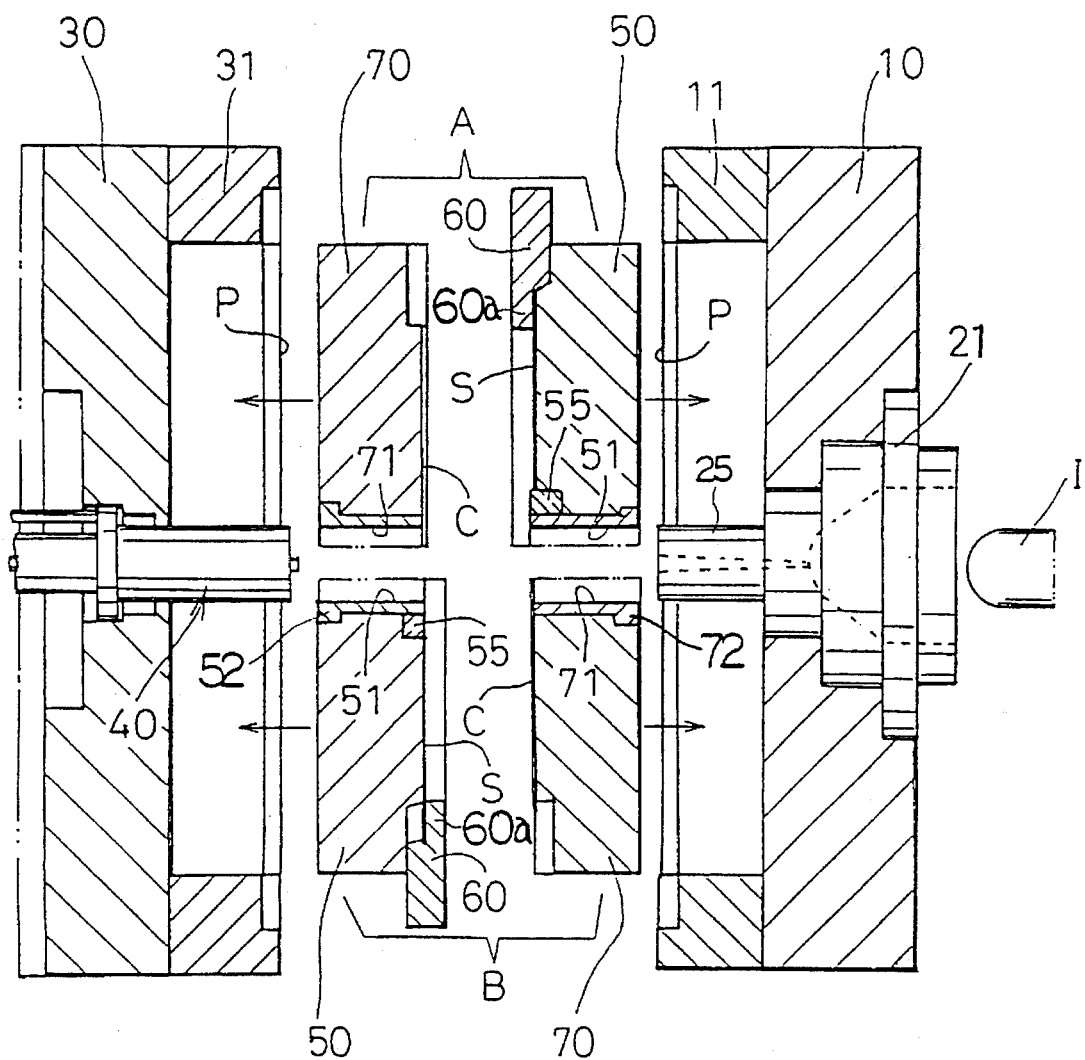
FIG. 1 is a schematic sectional elevation view of the mold of the present invention.

FIG. 1 illustrates that a stamper S is capable of being mounted selectively on either the movable half-mold side or the stationary half-mold side. FIG. 1 shows two arrangements. Stamper plate 50 for the back stay of the stamper S is mounted on a stationary plate 10 and a mirror plate 70 for forming a surface of a disc cavity is mounted on a movable plate 30, as shown in the upper portion(A) of the drawing. As shown in the lower portion(B) of the drawing, a stamper plate 50 for the back stay of the stamper S is mounted on the movable plate 30 and a mirror plate 70 for forming a surface of a disc cavity is mounted on the stationary plate 10.

The stamper plate 50 or the mirror plate 70 can be mounted in the inner periphery of a stationary cylindrical member 11 of which the rear end portion is fixed to the stationary plate 10. A locating ring 21 is mounted at the center of the stationary plate 10. A movable cylindrical member 31 is fixed to the movable plate 30 at rear end of that. A male cutter and ejecting member 40 is mounted in the movable plate 30 for forming a center aperture of a molded disc and for ejecting of that.

The stamper place 50 has a center bushing 52 that provides an aperture 51. The mirror plate 70 has a center bushing 72 that provides an aperture 71.

An inner stamper holder 55 and an outer stamper holder 60 with projection 60a are provided for holding a stamper on the stamper plate 50 at the inner periphery and the outer periphery respectively. A mark P indicates a parting surface of the mold.

Figure 2:
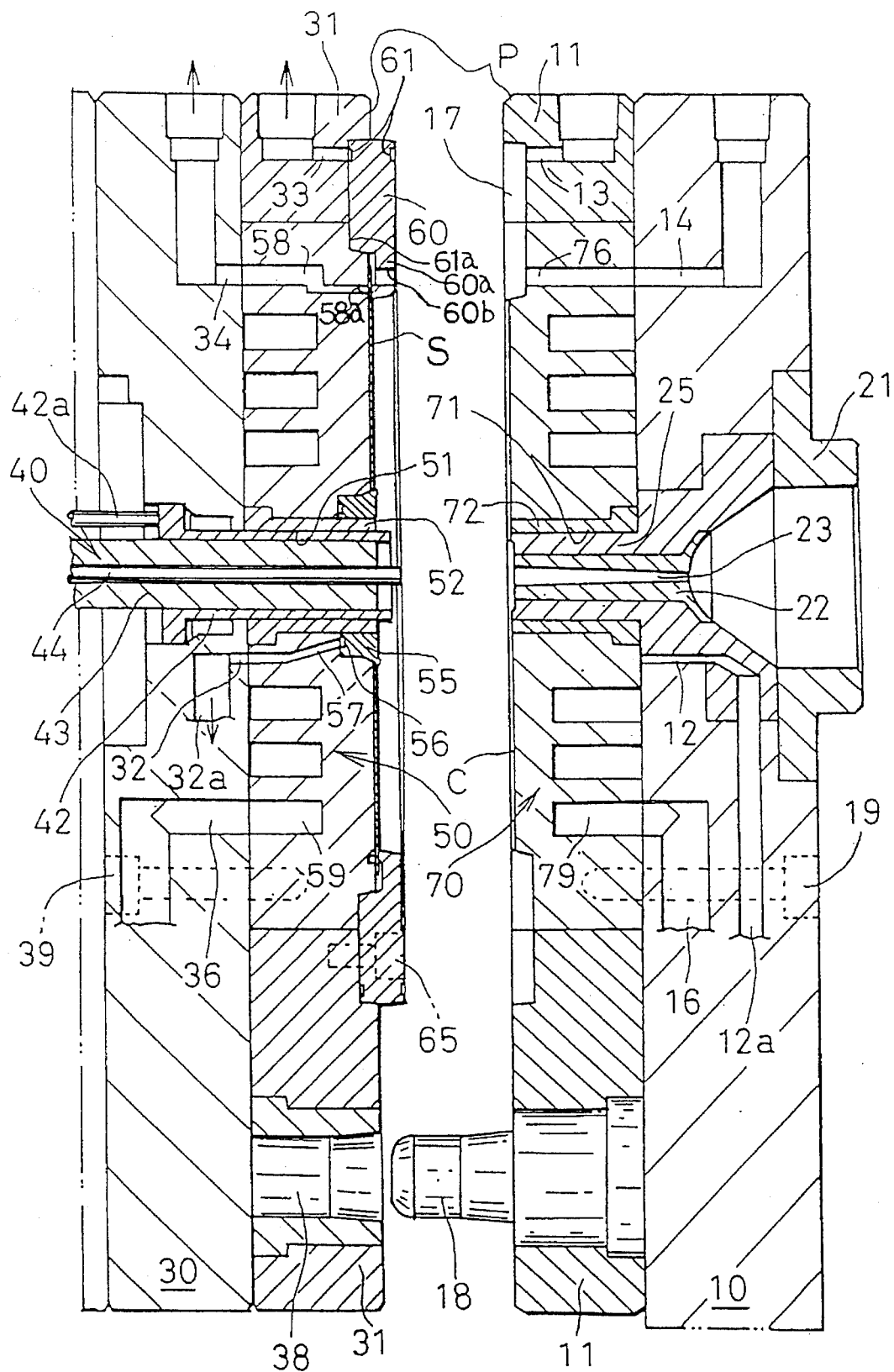
FIG. 2 is a sectional elevation view of the mold, wherein a mirror plate for retaining a stamper is mounted on the side of the movable platen at mold opening.
Figure 3:
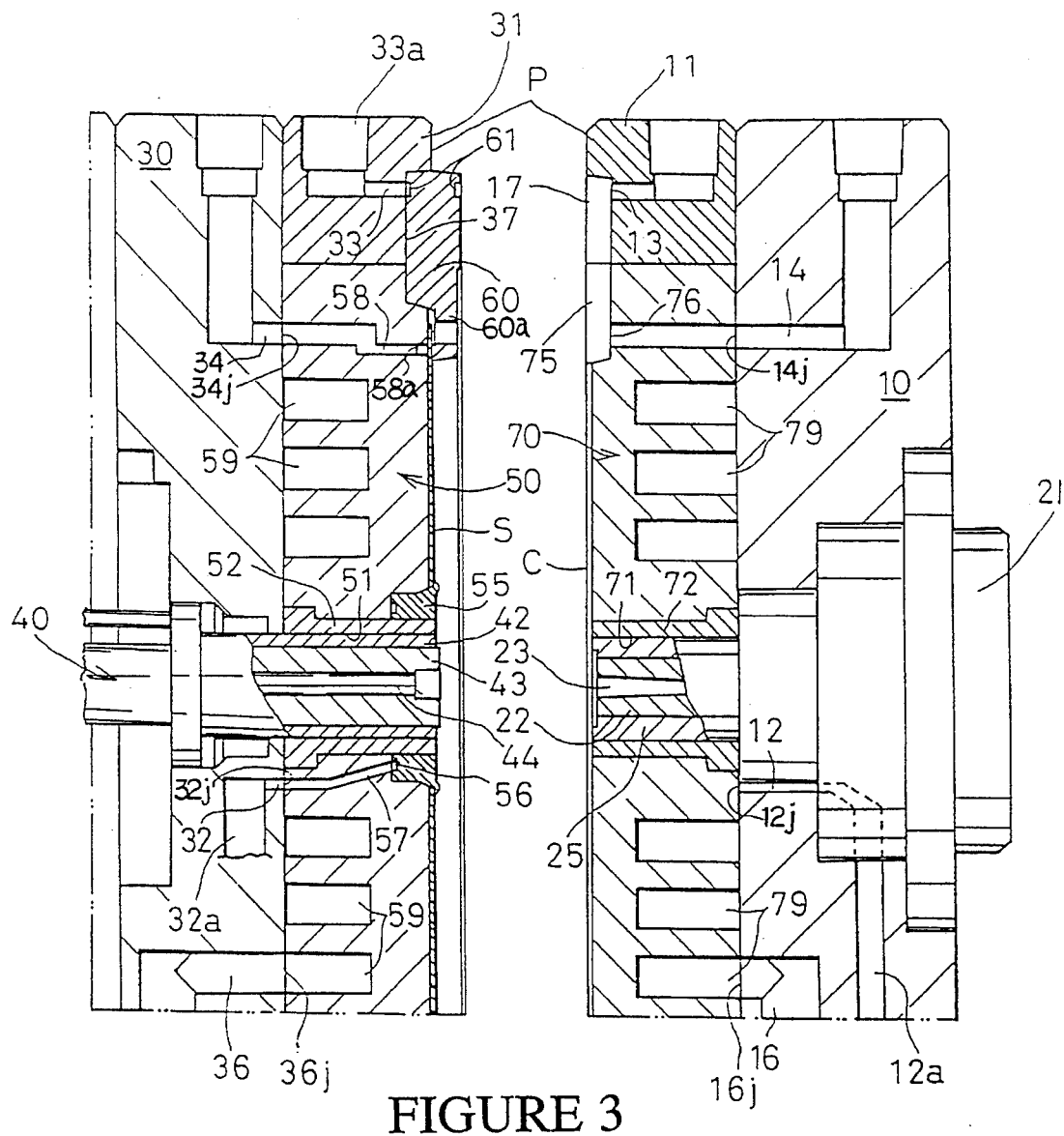
FIG. 3 is an enlarged fragmentary elevation view of FIG. 2.
Figure 4:
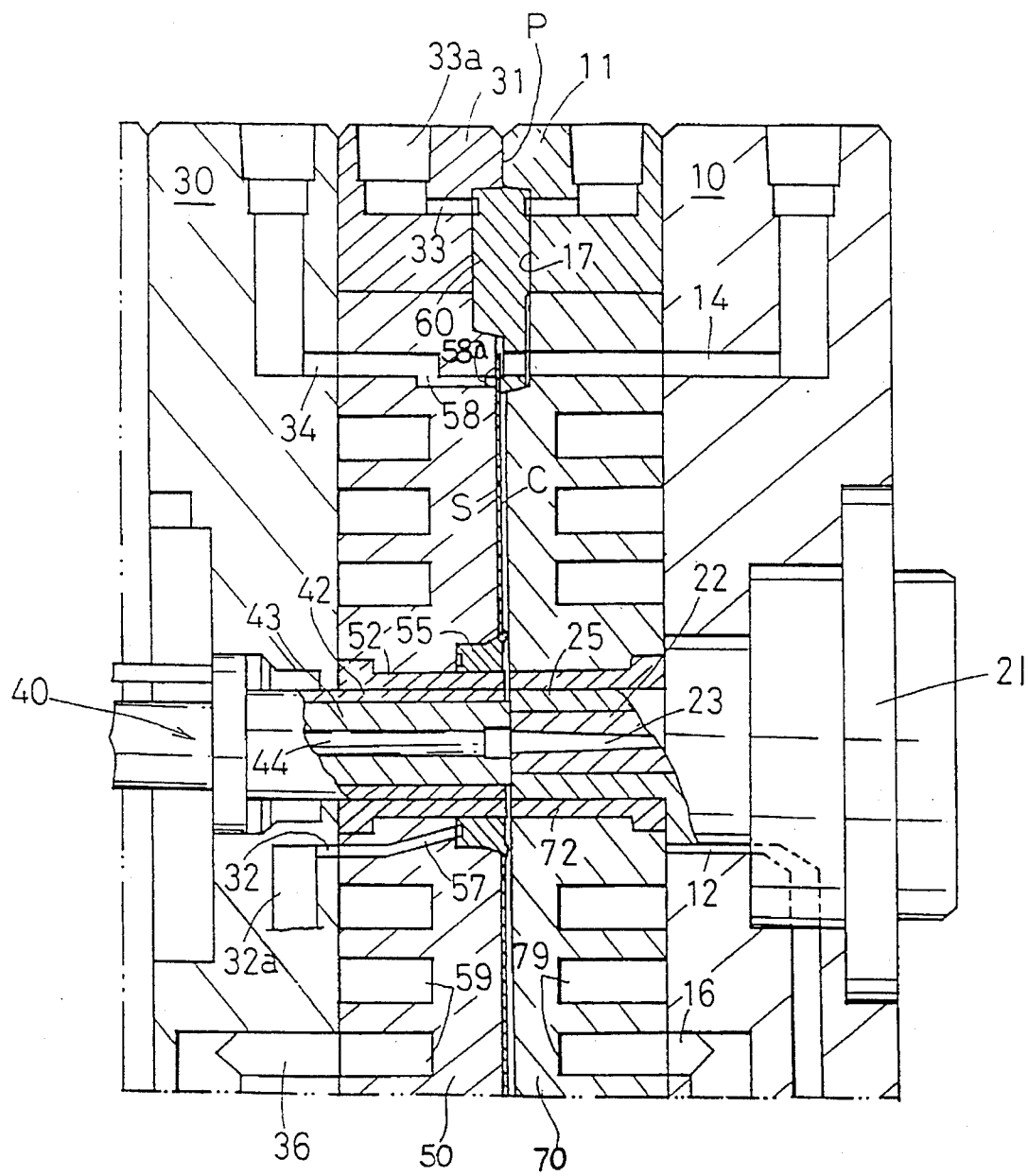
FIG. 4 is a sectional fragmentary elevation view of the mold, wherein a mirror plate for retaining a stamper is mounted on the side of the movable platen at mold closing.

FIGS. 2–4 show that the stamper plate 50 for the back-stay of the stamper S is fixed to the movable plate 30 by plural bolts 39 and the mirror plate 70 for forming a surface of a disc cavity is fixed to the stationary plate 10 by plural bolts 19. Air passages 32 and 32a are provided in the movable plate 30, through which air is sucked to attract the inner stamper holder 55 toward the stamper plate 50. An air passage 13 is provided with a stationary cylindrical member 11 and an air passage 33 is provided with a movable cylindrical member 31 for attracting the outer peripheral stamper holder 60, having an annular air channel 61, by vacuum force. Air passages 14 and 76 are provided with the mirror plate 70 and in the stationary plate 10 for blowing air to separate molded discs from the surface of the stamper S before mold break (through the hole 60b which is located in the projection 60a of the outer stamper holder 60). Air passage 58, having an annular channel 58a, and air passage 34 are provided in the stamper plate 50 and the movable plate 30 for attracting the outer periphery of the stamper S.

A hot water passage 16 in provided with the stationary plate 10. Four guide pins 18 are fixed to the stationary plate 10. A locating ring 21 is mounted in the center of the stationary plate 10 and a female cutter 25 is mounted concentrically to the locating ring 21 in the stationary plate 10 for guiding the front portion of a male cutter 43 provided with the movable plate 30.

A sprue bushing 22 with a sprue aperture 23 is inserted in the female cutter 25. An annular air channel 56 which is located on the bottom of the inner stamper holder 55 through air passages 59, 32, and 32a is provided for attracting the inner stamper holder 55. An air passage 58, having an annular air channel 58a and connecting to an air passage 34, is provided in the stamper plate 50 in the movable plate 30 for attracting the outer periphery of the stamper S by vacuum force. A hot water passage 36 is provided with the movable plate 30. Four guide bushings 38 are mounted at such position of the movable plate 30 that the guide pins 18 can be inserted.

A central ejecting device 40 in the center bushing 52 of the movable plate 30 includes an ejector sleeve 42 actuated by rods 42a, a male cutter 43, and an ejecting pin 44 which are actuated by well known methods for molding discs.

Stamper plate 50 for the back-stay of the stamper S has a center bushing 52 for inserting the center ejecting device 40 or the female cutter 25 into an inner periphery 51 thereof, an annular air channel 58a connecting to an air passage 58 for attracting the stamper S at the outer periphery, a water channel 59 for circulation of controlled hot water, and a step portion 61a to admit the bottom portion of the outer peripheral stamper holder 60.

The outer peripheral stamper holder 60 is fixed preferably by plural boles 65 but can also be held by vacuum.

Mirror plate 70, for forming a surface of a disc cavity C, has a center bushing 72 for inserting the center ejecting device 40 or the female cutter 25 into the inner periphery thereof, an air passage 76 for separating the molded discs from the stamper S by blowing air, and a water channel 79 for circulation of controlled hot water.

In the present invention, stamper plate 50 and mirror plate 70 are designed so that each of them is capable of being mounted interchangeably to either of the stationary plate 10 or the movable plate 30, that is, each of them has same outer diameter and aperture inner diameter so as to accept the center bushing 52 or 72 for locating the center ejector device 40 or the female cutter 25.

Though not shown in the Figures, in practice, slight gaps between the inner periphery of the center bushing 52 and outer periphery of the ejector sleeve 42 and between the inner periphery of the center bushing 72 and the outer periphery of the female cutter 25 are provided so as to enable blowing to eject the molded discs, Also a slight gap between the projection 60a of the outer stamper holder 60 and the surface of the stamper S is provided so as to enable blowing of separate molded discs from the surface of the stampers.

Details of exchanging the mirror plates for changing the set position of the stamper S are as follows.

Referring to FIGS. 2 and 3 showing the mold opened, the stamper plate 50 is fixed to the movable plate 30 by plural bolts 39 concentric with the movable cylindrical member 31. Then, after the stamper S is set with concentric to the stamper plate 50, the inner stamper holder 55 holds the inner periphery of the stamper S by vacuum force due to suction of air through the annular air channel 56 and the outer stamper holder 60 with projection 60a, which is located in a concave portion 37 romped in the movable cylindrical member 31 and outer periphery of the stamper plate 50, holds the outer periphery of the stamper S by vacuum force due to suction of air through the annular air channel 61 of the outer stamper holder 60 connected to an air passage 33, 33a.

The water channel 59 provided at the back side of the stamper plate 50 is connected to a hot water passage 36 for controlling the temperature of the stamper plate 50. The mirror plate 70 is fixed to the stationary plate 10 by plural bolts 19 concentric to the stationary cylindrical member 11.

A surface of the mirror plate 70 is a plane surface of the mold cavity C. A portion of the outer periphery of mirror plate 70 has a step portion 75 so that a portion of the outer stamper holder 60 can be put in when closing the mold. The water channel 79 provided with the back side of the mirror plate 70 is connected to a hot water passage 16 for controlling the temperature of the mirror plate 70. A hot water port 16j through the hot water passage 16 and a hot water port 36j through the hot water passage 36 are located symmetrically to the parting line of the mold so that each of the hot water ports 16j and 36j are capable of being connected to either the water channel 59 or the water channel 79, even if the stamper plate 50 and the mirror plate 70 are fixed to either side of the stationary plate 10 or the movable plate 30. An air port 34j and 32j are located symmetrically to an air port 14j and 12j respectively in the movable plate and stationary plate.

After the operation of exchanging the mirror plates for changing the set position of the stamper S is finished, an injection molding operation starts and then, as shown in FIG. 4, the mold is closed for melted resin to be injected into the cavity C.

Figure 5:
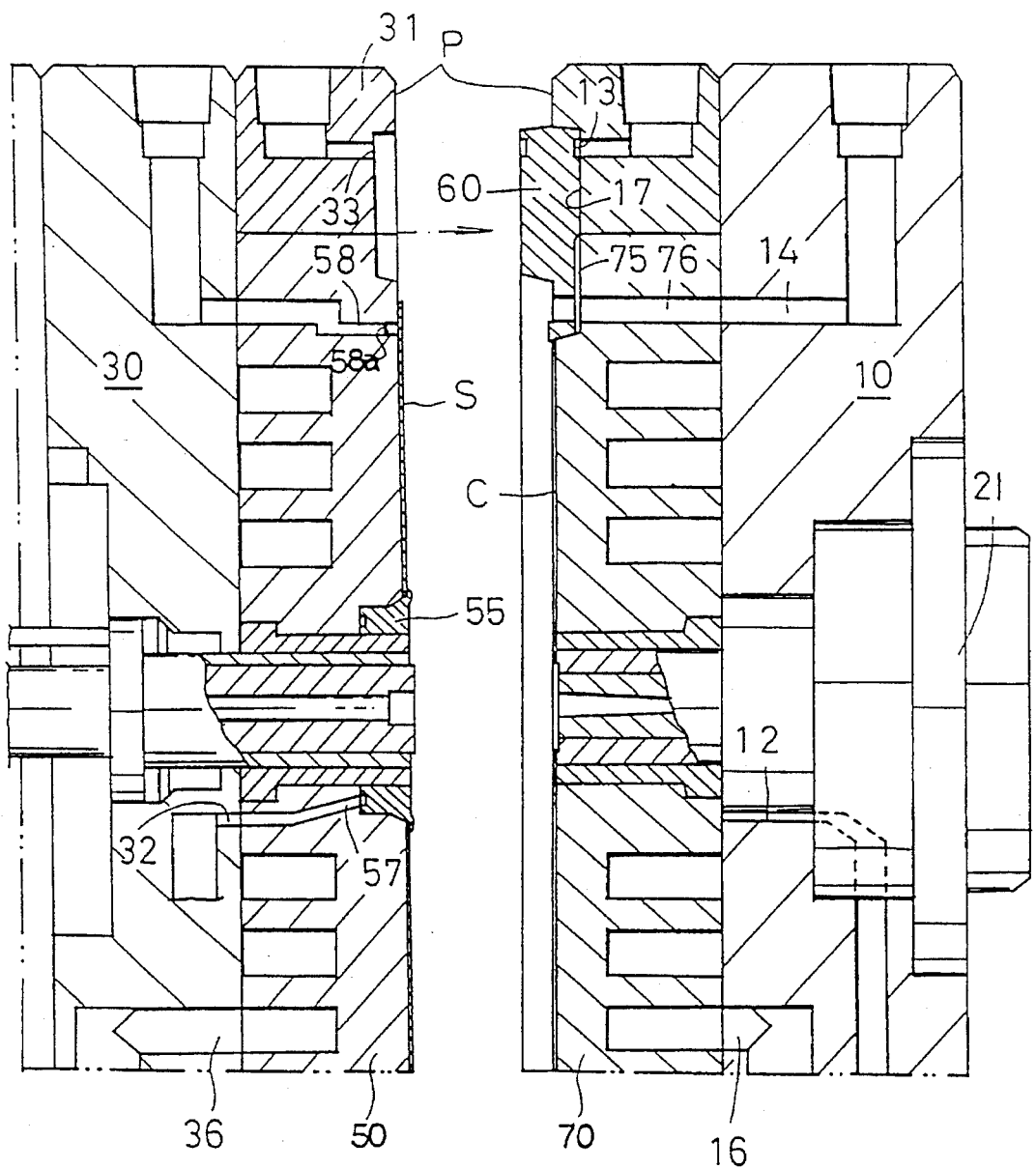
FIG. 5 is a sectional fragmentary elevation view of the mold, wherein an outer stamper holder is held at side of the stationary plate at mold opening.

Exchanging of the stamper S as shown in FIG. 5 takes place as follows, when only exchange of the stamper S is required: firstly the mold is opened to take out the bolts 65 from the outer stamper holder 60, keeping the outer stamper holder 60 toward the movable plate side to attract by vacuum force; then after closing the mold, suction of air passage 33 at the movable cylindrical member is stopped; simultaneously, suction of air from the air passage 13 at the stationary cylindrical member is started to attract the outer stamper holder 60 toward the stationary plate side; after stopping suction of air from the air passage 32 to take out the inner stamper holder 55, the stamper S can be exchanged for another one.

Figure 6:
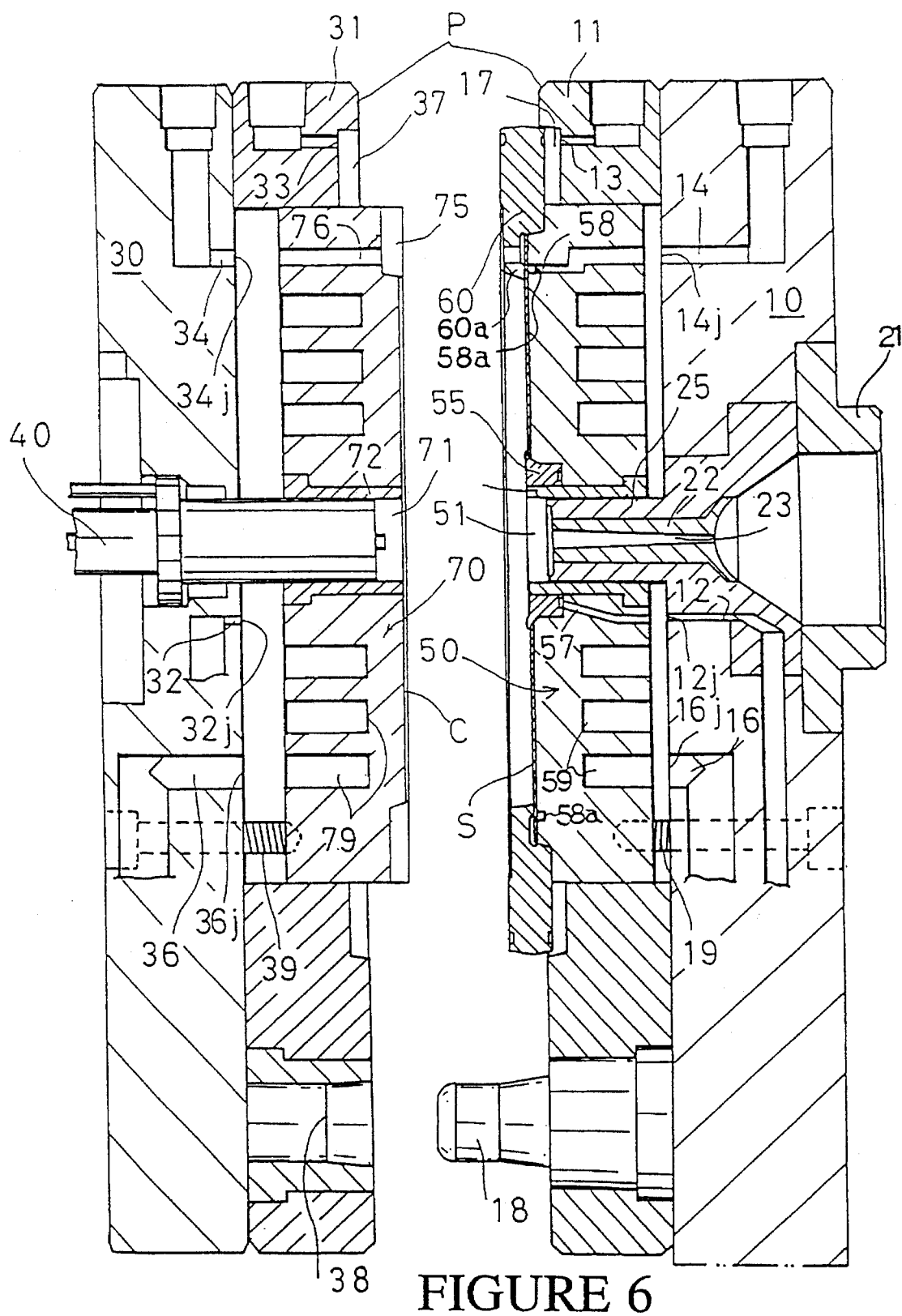
FIG. 6 is a sectional elevation view of the mold, wherein the stamper S is being exchanged to the stationary plate with the mirror plate.
Figure 7:
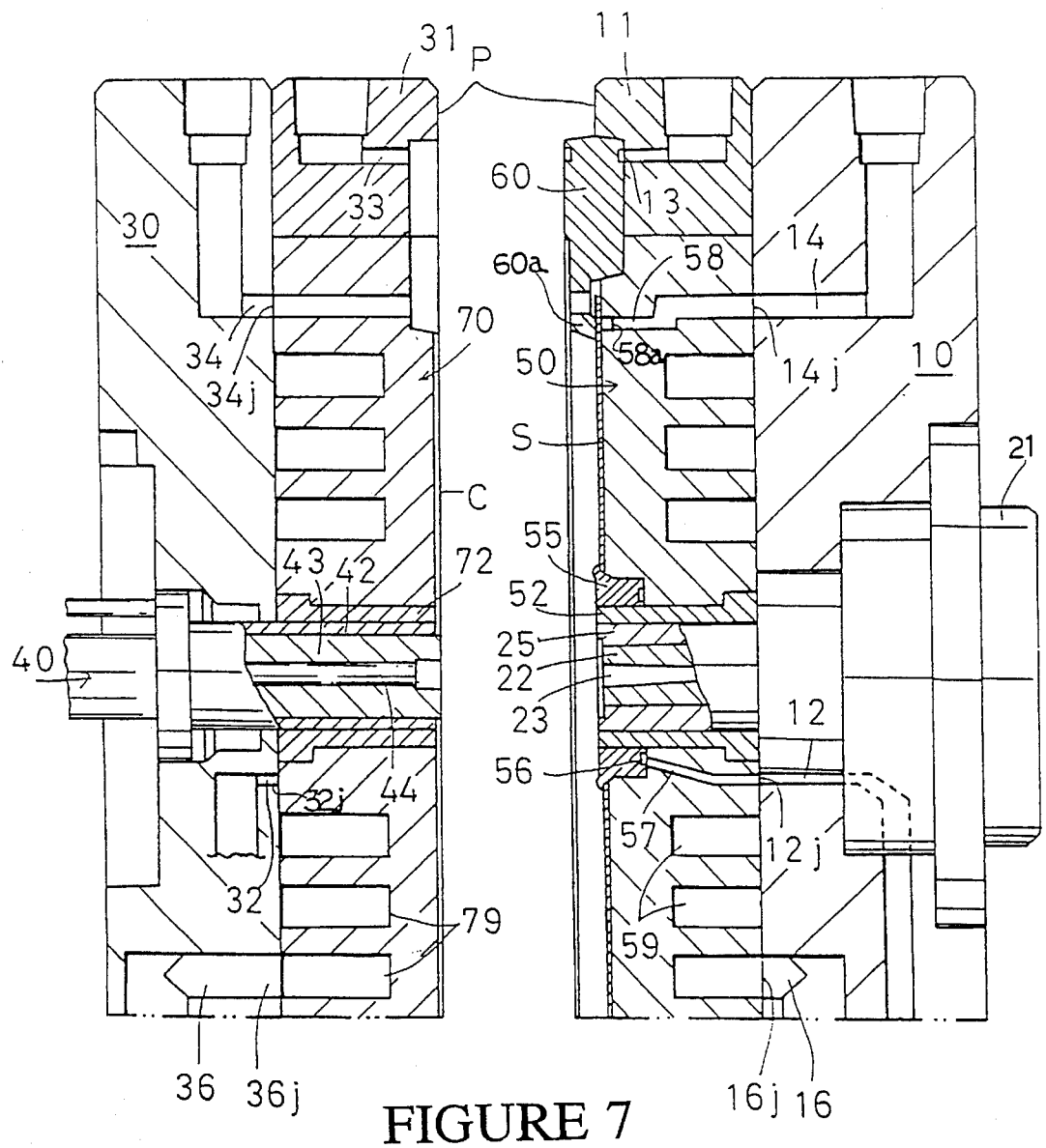
FIG. 7 is an enlarged fragmentary elevation view, wherein a removal of the stamper S to the stationary platen side has completed.

Changing the set position of the stamper S takes place as follows:

FIG. 6 shows a midway step of the process of changing the stamper S from the movable plate side to the stationary plate side. After the outer stamper holder 60 and inner stamper holder 55 are removed from the movable plate side, the stamper plate 50 and the mirror plate 70 are taken out from respectively the movable plate 30 and the stationary plate 10. Then the stamper plate 50 for the back stay of the stamper S is mounted on the stationary plate 10 and the mirror plate 70, for forming a surface of the disc cavity C, is mounted on the movable plate 30. As shown in FIG. 7, the inner stamper holder 55 is inserted on the outer periphery of the front portion of the center bushing 52 to allow the stamper S to hold in the center portion by vacuum force through the annular air channel 56 which is connected to the air passages 57, 12 and the outer periphery stamper holder 60 allows the outer periphery of the stamper S to hold. The center ejecting device 40 is inserted in the center bushing 72 of the mirror plate 70 mounted on the movable plate 30.

As mentioned above, the present invention includes a novel mold in which the stamper S is capable of being held on either side of the movable plate or the stationary plate due to The mirror plate and the stamper plate being capable of mounting on either side of the stationary plate 10 or the movable plate 30, wherein the mirror plate and stamper plate have a common outer diameter, the air ports for suction or blowing of air and the hot water ports are located in symmetrical positions to the parting surface of the mold, and the center bushings are of common size in order to match various requirements in the molding of disc on resin flow study.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. In a mold with a cavity for injection molding of a resin disc between a pattern stamper plate (50, S) and a smooth mirror plate (70, C), the disc including a central aperture, the mold including a stationary cylindrical member (11) including a stationary rear end surface and a first inner periphery, a stationary platen plane (10) fixed to the stationary rear end surface and having a sprue bushing (22) for injection of melted resin material into the cavity, a movable cylindrical member (31) including a movable rear end surface and a second inner periphery, a movable platen plate (30) fixed to the movable rear end surface and having a male cutter (43) for forming the central aperture of the disc and an ejecting member (40) on an outer periphery of the male cutter for ejecting the disc;

the improvement, for changing a set position of the stamper plate, comprising:

an outer peripheral stamper holder (60) having a projection portion (60a):

an inner peripheral stamper holder (55);

vacuum means (57) for operating the inner peripheral stamper holder by vacuum;

the stamper plate being capable of insertion into selectively the first inner periphery and the second inner periphery;

the stamper plate including a first step portion (61a) for contacting a bottom side of the outer peripheral stamper holder, a central stamper plate hole for accepting a first center bushing (52), an annular air channel (58a) for attracting a stamper outer periphery toward the stamper plate;

a first air passage for attracting the inner peripheral stamper plate holder (55) toward the stamper plate; and a first water channel for circulation of hot water at controlled temperature;

the mirror plate being capable of insertion into selectively the first inner periphery and the second inner periphery; and the mirror plate including a second step portion (75) for contacting a front side of the outer peripheral stamper holder, a central mirror plate hole for accepting a second center bushing (72), a compressed air passage for blowing air to separate molded discs from the surface of the stamper plate, and a second water channel for circulation of hot water at controlled temperature.

2. The mold according to claim 1, wherein the stationary cylindrical member and the movable cylindrical member each include a respective air passage to attract the outer peripheral stamper plate holder by suction.

* * * * *